United States Patent [19]
Mizukami

[11] Patent Number: 5,513,736
[45] Date of Patent: May 7, 1996

[54] CLUTCH COVER ASSEMBLY HAVING A WEAR COMPENSATION DEVICE

[75] Inventor: Hiroshi Mizukami, Neyagawa, Japan

[73] Assignee: Kabushiki Kaisha Daikin Seisakusho, Osaka, Japan

[21] Appl. No.: 396,832

[22] Filed: Mar. 1, 1995

[30] Foreign Application Priority Data

Mar. 8, 1994 [JP] Japan ..................................... 6-037038

[51] Int. Cl.$^6$ ................................................. F16D 13/75
[52] U.S. Cl. ................................... 192/111 A; 192/70.18; 192/70.25
[58] Field of Search ............................ 192/70.25, 111 A, 192/70.18

[56] References Cited

U.S. PATENT DOCUMENTS

| | | | |
|---|---|---|---|
| 4,437,555 | 3/1984 | Tomm et al. | 192/111 A X |
| 5,127,505 | 7/1992 | Beccaris | 192/70.18 X |
| 5,419,418 | 5/1995 | Uenohara et al. | 192/70.25 |

*Primary Examiner*—Rodney H. Bonck
*Attorney, Agent, or Firm*—Shinjyu Office Patent Attorneys

[57] ABSTRACT

A clutch cover assembly having a clutch cover fixed to the input rotation member of an engine; a pressure plate disposed within the clutch cover, having a pressing surface for clutching one side of a friction member; a support member disposed opposite the pressing surface side of the pressure plate being non-rotatable with respect to the pressure plate and movable in the axial direction; a pressing member urging the pressure plate toward the input rotation member via the support member, the pressing member and the support member having a predetermined position relative each other initially; a wear compensation device disposed between the pressure plate and the support member, which restrictively supporting the support member at the predetermined position, and displacing the support member with respect to the pressure plate and thereby returning the support member to the predetermined position with respect to the pressing member after the support member and the pressure plate were displaced from the predetermined position due to wear on the friction members during clutch engagement; and strap plates elastically flexible in the axial direction, connecting the clutch cover and the support member to rotate together.

9 Claims, 7 Drawing Sheets

CLUTCH COVER ASSEMBLY HAVING A WEAR COMPENSATION DEVICE

BACKGROUND OF THE INVENTION

The invention relates to a clutch cover assembly, particularly to a clutch cover assembly having a pressure plate, a diaphragm spring and a compensating mechanism disposed therein for maintaining a generally uniform bias position of the diaphragm spring with respect to the pressure plate irrespective of the wear on a clutch disc.

DESCRIPTION OF THE RELATED ART

A clutch cover assembly is typically fixed to a flywheel of an engine and includes a pressure plate which urges a clutch disc against the flywheel in order to selectively transmit engine power to a transmission connected to the clutch. It is very desirable to increase the life of the clutch cover and a clutch disc. One method of increasing the effective thickness and the life of the clutch disc, for example, is to the attach facings to a clutch plate without using rivets.

One example of conventional technology, Japanese Patent Laid-Open Document No. 27092/1989, provides for a clutch cover assembly in which the initial load of the diaphragm spring automatically is returned to its initial set position when, disc wear occurs. The conventional assembly includes, disposed between the diaphragm spring and the pressure plate, an inner and outer fulcrum ring and a plurality of wear compensation mechanisms. The compensation mechanisms are disposed around the circumference of a pressure plate in a plurality of positions and are work to displace the fulcrum ring toward the diaphragm spring in response to wear on the facings. Each mechanism includes slide elements and coil springs. The slide elements are movable in a radially outward direction and are disposed in an annular groove formed in the pressure plate, and the springs urge the slide element radially outward. Forming a .wedge-like pattern, the fulcrum rings and the slide elements are disposed such that angled surfaces of the fulcrum rings touch the respective angled surfaces of the slide elements. When the release mechanism releases the pressure of the diaphragm spring and after the friction facings have worn, the slide elements push the fulcrum springs radially outward toward a contact portion of the diaphragm spring. Accordingly, the diaphragm spring maintains its initial flexed orientation along with its initial bias load.

In this conventional device, the pressure plate is fixed to the clutch cover by a plurality of strap plates so as to rotate integrally. Then, when the pressure of the diaphragm spring is released from the fulcrum rings, the pressure plate pulls away from the flywheel via the strap plates. In this way, the strap plates transmit a deflecting force on the pressure plate in a direction away from the flywheel, whereby the forces between the pressure plate and the fulcrum rings become even larger. The larger these forces are, the larger the loads of the coil springs must be in order to overcome them. Accordingly, the device is difficult and expensive to employ in such assemblies.

SUMMARY OF THE INVENTION

One object of the present invention is to make uniform the deflective force from the strap plates, even when wear on the clutch disc occurs.

Another object of the present-invention is to reduce cost of the assembly.

In one aspect of the present invention, a clutch cover assembly is connected to the engine flywheel, for engaging and disengaging a clutch disc to and from an input rotation member of a transmission. The assembly includes a dish-shaped clutch cover, a round pressure plate, a support member, a pressing member, a wear compensation device and strap plates.

The dish-shaped clutch cover is fixed to the input rotation member. The pressure plate is disposed inside the clutch cover and has a pressing surface for pressure contact with one surface of the clutch disc and an annular groove portion formed on the side opposite its pressing surface at a given radius about the C-L axis. The support member is disposed opposite the pressing surface side of the pressure plate, is non-rotatable relative the pressure plate, and is axially movable. The pressing member presses the pressure plate toward the input rotation member by way of the support member. The wear compensation device, besides connecting the support member to the pressure plate, also moves the support member from the pressure plate toward the pressing member a distance compensating for the amount of wear on the clutch disc. The strap plates connect the clutch cover and the support member such that they are non-rotatable relative each other, and are elastically flexible in the axial direction.

It is preferable in the initial condition that the strap plates urge the support member in a direction away from the input rotation device.

It is also preferable that the wear compensation device include an urging member for urging the support member away from the pressure plate such that it moves toward the pressing member, and a restriction mechanism to restrict the urging member from at times displacing the support member toward the pressing member and to at other times allow such movement in accordance with the wear on the clutch disc.

It is desirable that the pressure plate be formed with axial holes, that the restriction mechanisms be inserted and frictionally stopped within the hole, and that the restriction mechanism have an end touching the input rotation member when the clutch is engaged and another end restricting movement of the support member toward the pressing means. Furthermore, during clutch engagement adjustment the restriction mechanism occurs, due to its contact with the input rotation device and the urging force of the diaphragm spring upon the pressure plate. The restriction mechanisms are thus pushed in the opposite direction by the input rotation member in their respective holes in the pressure plate a distance equivalent to the amount of wear on the clutch disc. Therefore, a gap develops after release of the clutch engagement between the position at which the restriction mechanism restricts the support member prior to and subsequent the above explained clutch engagement. After release, the urging member urges the support member away from the pressure plate until the gap between the support member and the restricting end of the restriction mechanism meet. Thereby, the support member is allowed to move a distance equivalent to the amount of wear on the clutch.

The maximum frictional force produced between the restriction mechanism and the axial hole of the pressure plate is preferably smaller than the pressing forces of the pressing member on the support member and greater than the sum of the urging forces of the urging means and the strap plates against the support member.

It is also desirable for the support member to have a radially flanged portion possessing a plurality of holes, and for the restriction members to have a cylinder element, a plug element and a bolt-like member. The restriction members are disposed inside the hole of the pressure plate. The cylinder element has an internal tapered bore going completely through the element. The radius of the bore, when disposed within the hole of the pressure plate, decreases in the direction away from the input rotation member and is formed with cut sections such that it is expandable diametrically. When the clutch is engaged, one end of the cylinder element contacts the input rotation member. The plug element is shaped much like a truncated cone. This radius is tapered such that when the plug element is placed within the cylinder element their respective radially inner surfaces complementary contact each other. The bolt member has a head portion and an long body portion. The body portion of the bolt member is connected to the clutch cover side axial face of the plug element and protrudes through the hole portion of the support member such that the head portion is on the clutch cover side. The head portion is formed larger in diameter than the holes of the support member. Accordingly, when the support member urges the head portion of the bolt toward the pressing member via the flanged portion, the secondary tapered surface of the plug element taper body expands the sides of the cylinder element. The sides of the cylinder element thus expanded press-against the radially inner surface its respective hole of the pressure plate. Thus, frictionally stopping movement of the restriction member elements in the hole.

The urging means is seated deep into the groove of the pressure plate, and the support member is disposed partially within the groove over it. The urging means desirably includes a pair of facing wedge elements aligned to extend in directions along the radius within the groove of the pressure plate. Each wedge element contacts the other on a slanted main face. The urging means further includes an urging element disposed on a side the wedge element deepest within the pressure plate groove urging it against the main face of the other wedge element. The urging element thus moves the other wedge element axially toward the pressing member.

It is desirable that the urging element be a coil spring.

The forgoing and other objects, aspects and advantages of the present invention will become more apparent form the following detailed description, when taken in conjunction with the accompanying drawings.

DETAILED DESCRIPTION OF THE PREFERRED EMBODIMENTS

Figure 1:
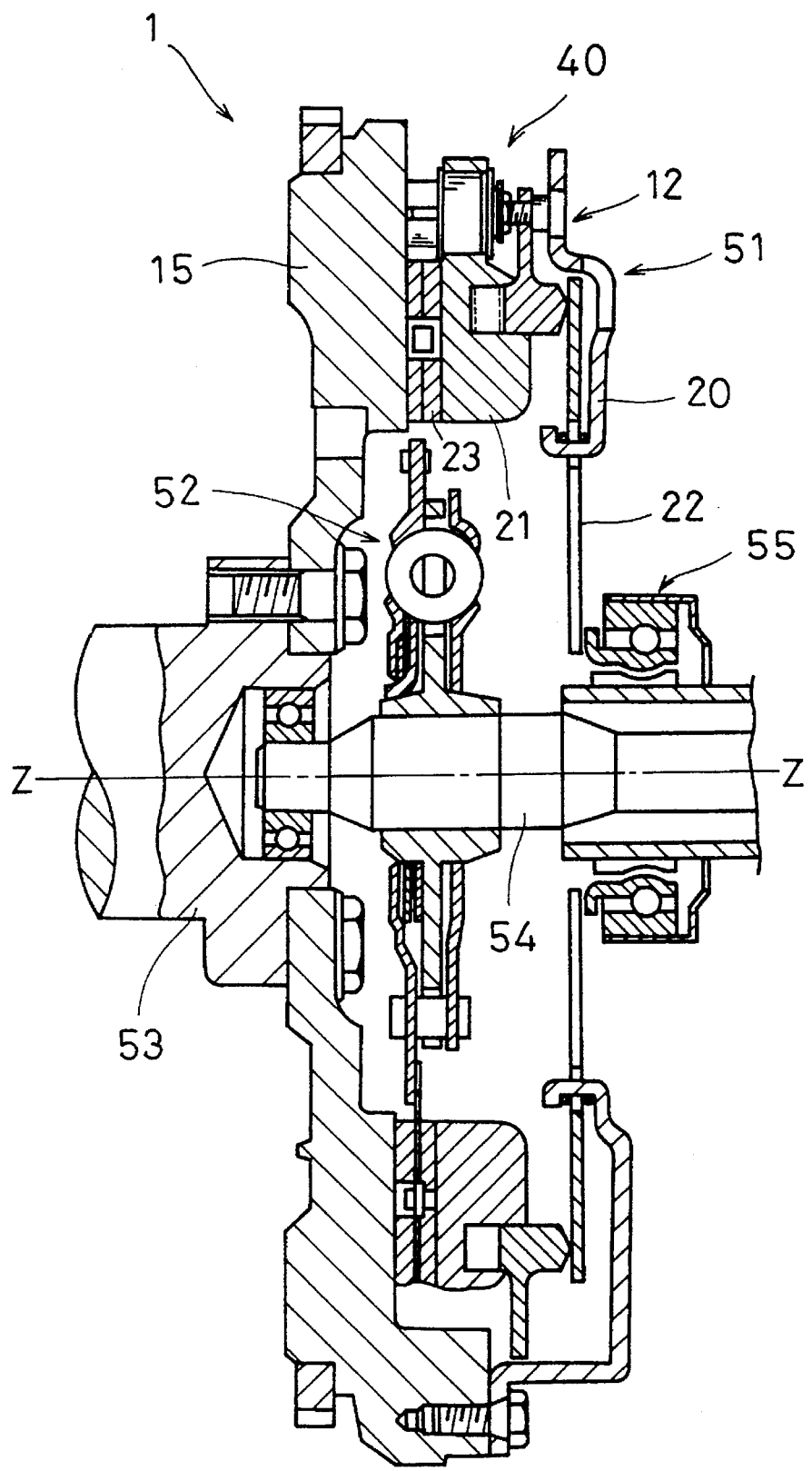
FIG. 1 is a fragmentary cross-section of a clutch assembly in accordance with one embodiment of the present invention.

The clutch assembly shown in FIG. 1 is a first embodiment of the present invention. The clutch assembly 1 is an apparatus for transmitting torque to, and disconnecting torque from a crankshaft 53 to a main drive shaft 54 which extends from a transmission (not shown) toward a flywheel 15. The main drive shaft 54 and the apparatus in general have a central axis C-L. The flywheel 15 is connected to the crankshaft 53 of an engine (not shown). The engine (not shown) is to the left side of FIG. 1 and the transmission (not shown) is to the left of FIG. 1.

This clutch includes a clutch cover assembly 51 attached to the flywheel 15, and a clutch disc assembly 52. The center of the clutch disc assembly 52 is spline engaged to the main drive shaft 54. Release bearings 55 are disposed around the main drive shaft 54 to move freely in an axial direction along the C-L axis. Friction facings 23 of the clutch disc assembly 52 is disposed between the clutch cover assembly 51 and the flywheel 15.

Figure 2:
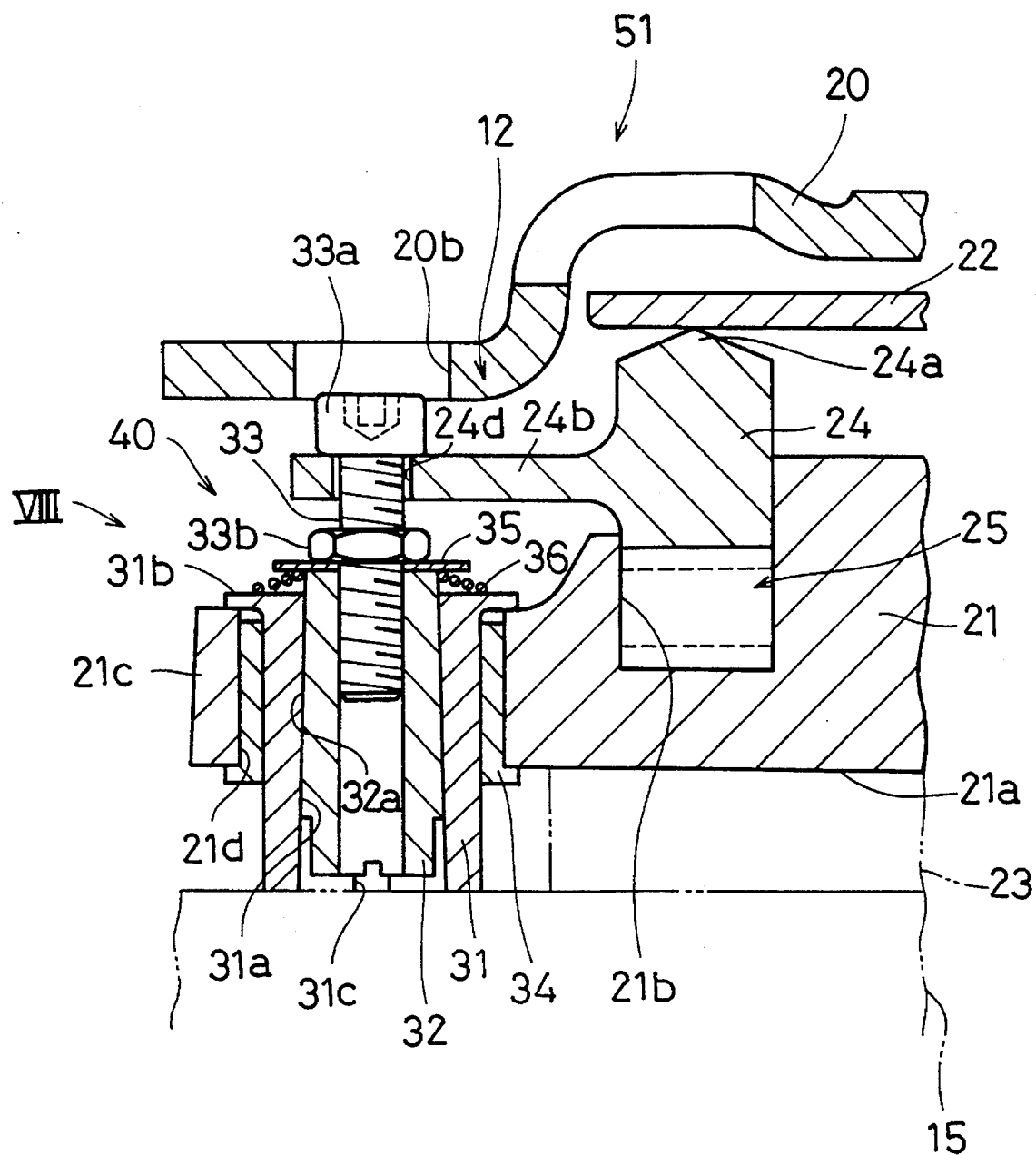
FIG. 2 is a fragmentary cross-section of a portion of the clutch cover assembly depicted in FIG. 1, on a slightly enlarged scale.

The clutch cover assembly 51 of the first embodiment is shown in more detail in FIG. 2.

Figure 8:
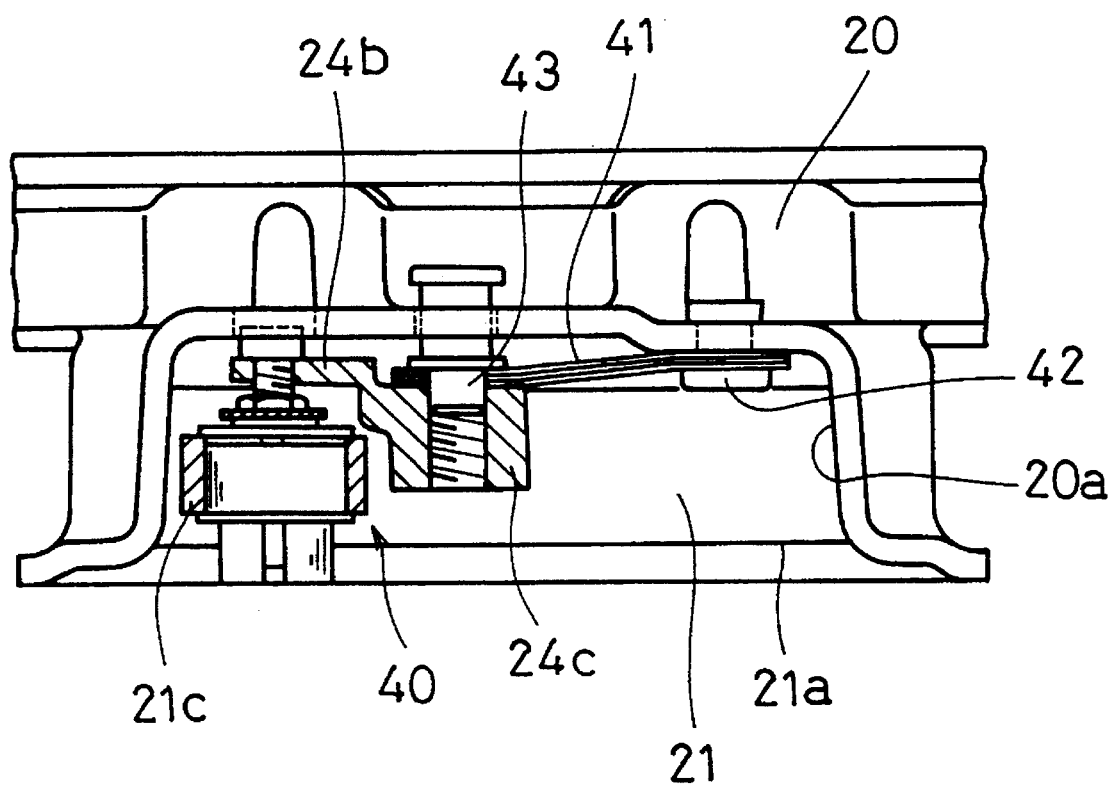
FIG. 8 is a fragmentary cross-section side view of the assembly looking in the direction of the arrow VIII in FIG. 2.

In FIG. 2, the clutch cover assembly 5 1 includes a clutch cover 20, a pressure plate 21, a fulcrum ring 24, a diaphragm spring 22, and strap plates 41(see FIG. 8). Further included in the clutch cover assembly 51 is a wear compensation device 12.

The clutch cover 20 is generally a dish shaped element and is rigidly attached to the flywheel 15. Around the outer wall of the clutch cover 20, as shown in FIG. 8, are radially outward opening apertures 20a formed at an interval about the outer circumference of the clutch cover 20.

The pressure plate 21 is a generally disc shaped element disposed within the clutch cover 20. The pressure plate 21 has a pressing face 21a for pressing the facings 23 of the clutch disc assembly 52 to the flywheel 15. On the other face of the pressure plate 21, the diaphragm spring 22 side, is formed an annular groove 21b. The annular groove 21b has for a center the axis C-L. Also, formed in the body of the pressure plate 21 on a radial exterior are coupling portions 21c which extend outwardly, facing and visible from the apertures 20a of the clutch cover 20, as is show in FIG. 8. In the coupling portion 21c, at a fixed interval about the axis C-L, are formed a plurality of holes 21d which extend axially through both sides of the pressure plate 21.

In a position radially inward the apertures 20a, are disposed strap plates 41 (shown in FIG. 8) formed from a plurality of metal bands extending generally perpendicular to a radial direction about the axis C-L. The strap plates 41 are disposed such they are highly rigid in the direction the clutch assembly 1 rotates about the center line C-L, but are flexible in the axial direction along the line C-L. One end of the strap plates 41 are connected to the clutch cover 20 via rivets 42, and the other end to the fulcrum ring 24 via bolts 43. The strap plates 41 couple the pressure plate 21 with the clutch cover 20 via the fulcrum ring 24 and the wear compensation device 12. The strap plates 41 connect the clutch cover 20 to these respective elements for unitary rotation about axis C-L, and separate the pressure plate 21 from engaging the facings 23 of the clutch disc assembly 52 against the flywheel 15 when the load from the diaphragm spring 22 is released during clutch disengagement.

Refering to FIG. 2, the fulcrum ring 24 is a disc shaped one piece body and is disposed in the annular groove 21b of the pressure plate 21. The fulcrum ring 24 does not rotate with respect to the pressure plate 21 but is movable in the axial direction. On the transmission side of the fulcrum ring 24 is formed a top portion 24a extending outwardly about the axis C-L. The fulcrum ring 24 has a flange portion 24b extending radially outward about the axis C-L and a plurality of strap plate coupling portions 24c disposed on the flange portion 24b at an interval about the axis C-L. The flange portion 24b has a plurality of holes 24d, and is connected to a restriction mechanism 40 as is described below. As is shown in FIG. 8, one end of the strap plates 41 are rigidly attached to the upper end of the coupling portion 24c with bolts 43 such that the strap plates 41 are forced to bend in the axial direction and bias the fulcrum ring 24 away from the pressure plate 21 during clutch disengagement.

The diaphragm spring 22 is disposed to be concentrically aligned between the clutch cover 20 and the fulcrum ring 24. The diaphragm spring 22, as shown in FIG. 1, is supported by the clutch cover 20 at the radial central portion on the clutch cover 20 side. The radially external portion touches the top portion 24a of each fulcrum spring 24, and urges the fulcrum ring 24 toward the flywheel 15. When the release bearings 55 press the radially inside portion of the diaphragm ring 22 toward the flywheel 15 side, the radially outward edge of the diaphragm spring 22 separates from the top portions 24a of the fulcrum ring 24.

The wear compensation device 12 includes an urging mechanism 25 which is positioned within the annular groove 21b of the pressure plate 21 between the pressure plate 21 and the fulcrum ring 24, and the restriction mechanism 40 which restrictively allows the fulcrum ring 24 to be pushed outward a distance toward the diaphragm spring 22 side by the urging mechanism 25 in accordance with the amount of wear on the facings 23.

Figure 3:
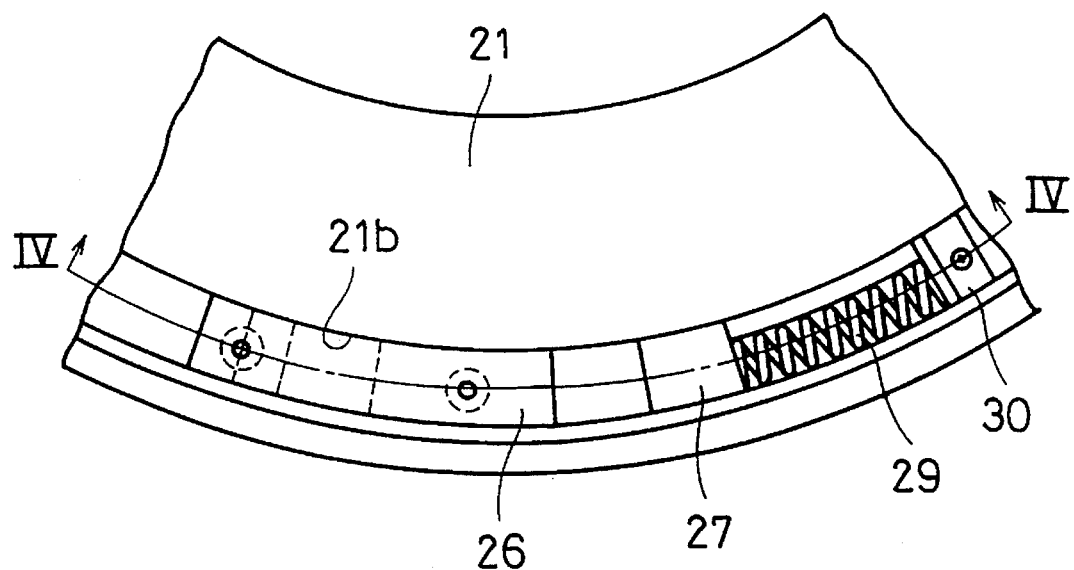
FIG. 3 is a fragmentary cross-section of a wear compensation device employed in the assembly depicted in FIGS. 1 and 2.
Figure 4:
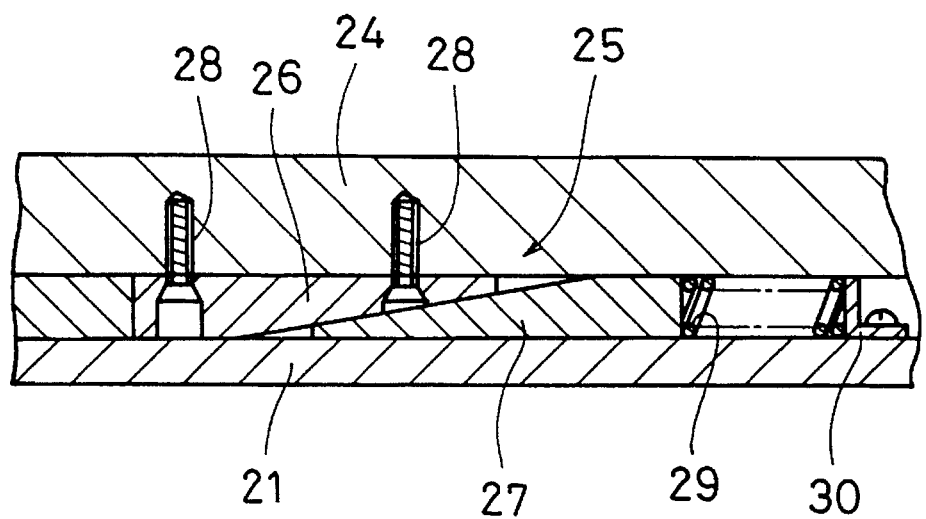
FIG. 4 is a fragmentary taken along the line IV—IV in FIG. 3.

Next, as shown in FIGS. 3 and 4, the urging mechanism 25 will be explained.

As is shown in FIGS. 3 and 4, inside the annular groove 21b at a fixed interval are disposed a plurality of paired tapered blocks. Each pair of blocks includes a primary taper block 26 and secondary taper block 27, the respective sloping faces of which have mutually touching slopes. The primary taper block 26 is rigidly attached to the bottom surface of the fulcrum ring 24 with two screws 28. The secondary taper block 27 freely moves within the annular groove 21b. Also within the annular groove 21b on one side of the secondary taper block 27 is rigidly attached a stopper piece 30 and, between the stopper piece 30 and the secondary taper block 27 is disposed a coil spring 29 for urging the secondary taper block 27 toward the primary taper block 26. That is, the primary taper block 26 is set to indirectly receive an urging force, upward in FIG. 4, from the secondary taper block 27 via the coil spring 29.

Figure 5:
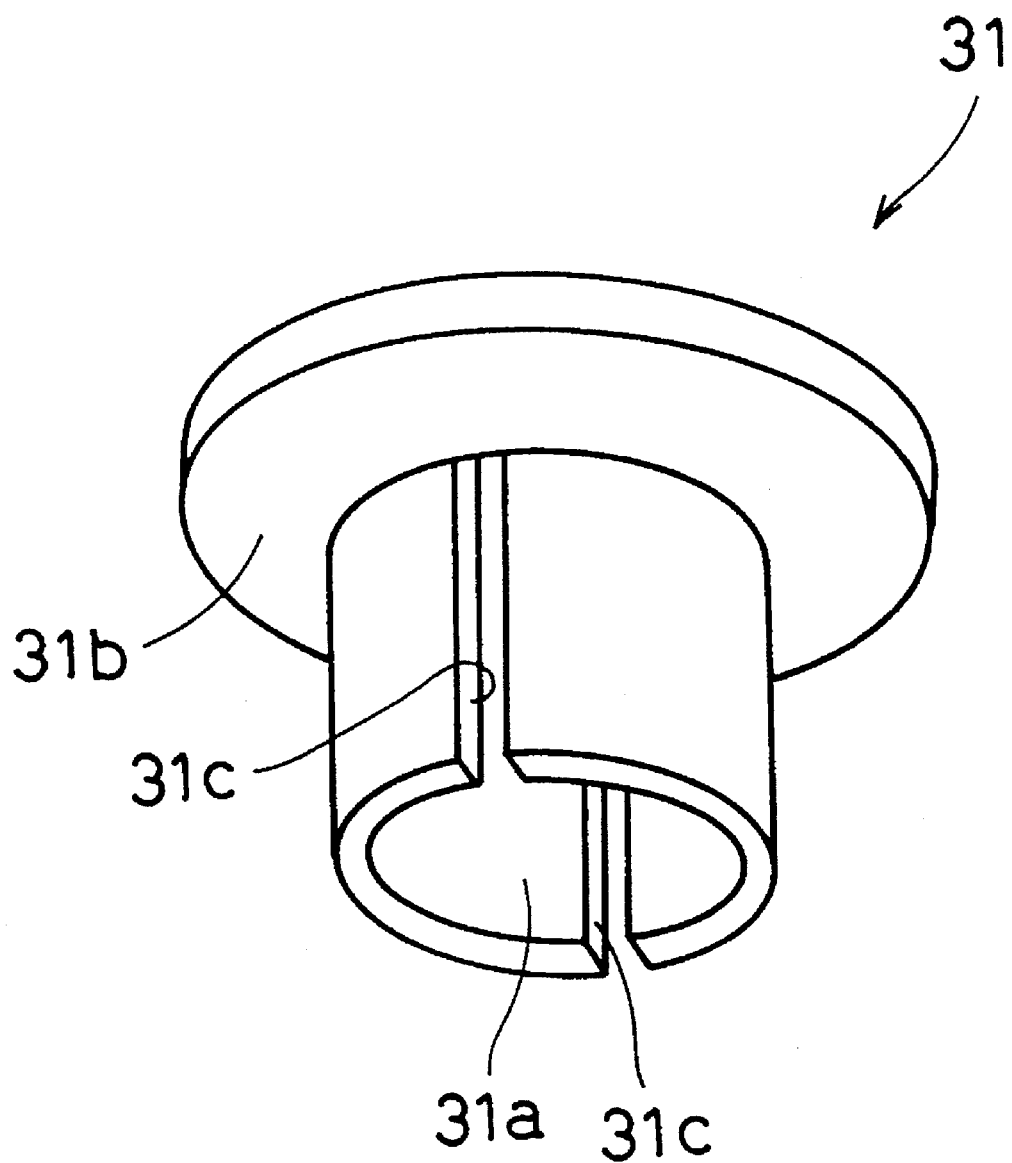
FIG. 5 is a perspective view of a wedge collar shown removed from the cover assembly.

The restriction mechanisms 40 (FIG. 2) are disposed within the plurality of holes 21d of the coupling portions 21c of the pressure plate 21. Each restriction mechanism 40 is generally made up of wedge collar 31, wedge 32, and bolt 33. The wedge collar 31 is generally cylindrically shaped and is preferably placed within a pipe-like liner 34; the liner 34 is previously disposed within holes 21d and is freely slidable in the axial direction. The liner 34 is made to move fixedly with the pressure plate 21 during engagement. The wedge collar 31 has an internal generally cone-like tapered bore 31a. The radius of the bore 31a decreases in the direction away from the flywheel 15. The wedge collar 31 has a stop flange 31b which touches on the clutch cover 20 side of the pressure plate 21. In the round circular pipe portion of the wedge collar 31, as shown in FIG. 5, are formed cut sections 31c opposite each other whereby the wedge collar 31 can contract and expand in the radial direction. In the initial condition as shown in FIG. 1, where the facings 23 are engaged between the pressure plate 21 and the flywheel 15, one end of the wedge collar 31 touches the flywheel 15.

The wedge 32 is generally shaped like a truncated cone, having an exterior tapered radius 32a and a hole 32b going through its center. The wedge 32 is for insertion into the internal tapered bore 31a of the wedge collar 31 such that adjoining tapered surfaces are complementary. The edge of the wedge 32 on the flywheel 15 side does not touch the flywheel 15. A disc-shaped plate 35 is rigidly attached to the diaphragm spring 22 side of the wedge 32 by nut 33b spirally engaged to the bolt 33. Between the plate 35 and the stop flange 31b of the wedge collar 31, there is disposed the coil spring 36. The coil spring 36 urges the wedge 32 into the wedge collar 31, which is the upward direction in FIG. 2. Accordingly, the wedge collar 31 and the wedge 32 are in locked engagement, mutually immovable, thereby preventing rattle due to the loose movement of parts. The bolts 33 protrude through the holes 24d which are formed in the flange 24b of the fulcrum ring 24, the head 33a of the bolts 33 are stopped flush with the clutch cover 20 side of the flange 24b, and the threaded end is screwed into the nuts 33b to extend partially into wedge hole 32b. Since the heads 33a of the bolts 33 rest on the flange portion 24b of the fulcrum ring 24 movement of the fulcrum ring 24 is restricted in the direction of the clutch cover 20(upward in the FIG. 2).

Moreover, the liner 34 is a member usable in adjusting the frictional coefficient between the wedge collar 31 of the restriction mechanism 40 and the hole 21d of the pressure plate 21. That is to say, the liner 34 is made of material which has a high frictional coefficient such that the frictional forces that develop between the wedge collar 31 and the holes 21d, via the liner 34, is greater than the frictional forces developed between the wedge collar 31 and the pressure plate 21 alone. Furthermore, the sum of the urging load applied to the bolts 33 of the restriction mechanism 40 from the urging mechanism 25 and the urging load produced by the strap plates 41 during a release operation are set so as not to exceed the maximum frictional forces produced between the wedge collar 31, the wedge 32, the liner 34 and the holes 21d of the pressure plate 21.

The holes 20b are formed in the clutch cover 20 to align with the heads 33a of the bolts 33. The holes 20b allow for the easy adjustment of the initial height at which the bolts 33 of the restriction mechanism 40 support pressure plate 21 via the fulcrum ring 24.

Next, operation of the clutch assembly 1 will be explained.

When the assembly is in the initial arrangement, the exterior of the diaphragm spring 22 indirectly pushes the pressure plate 21 via the top portion 24b of the fulcrum ring 24 toward the flywheel 15. Then, the pressure plate 21 presses the facings 23 against the flywheel 15.

First we will describe a release operation where no wear on the facings 23 has been generated. The outer portion of the diaphragm spring 22 is moved outward in the axial direction separating it from the fulcrum ring 24. Then, the combined urging load of the urging mechanism 25 and the strap plates 41 pull on the fulcrum ring 24. Resultantly, the combined loads further act on wedge 32 via the connection to the bolts 33 resting upon the flange 24b of the fulcrum ring 24. The wedge collar 31, the wedge 32 and the bolts 33 are acted on in the direction of the clutch cover 20.

Here, the mutually corresponding surfaces of the wedge 32 and the wedge collar 31 do not move with respect to each other, since the applied forces only cause the wedged surfaces 31a and 32a to press and expand outward against the liner 34 and the holes 21d of the pressure plate 21. That is, when the wedge 32 is acted on by the urging forces of the strap plates 41 and the urging mechanism 25 via the bolt 33, the radial outer surface 32a of the wedge 32 pushes directly outward on the inner surface 31a of the wedge collar 3 1 expanding the wedge collar 31 outward against the liner 34.

Furthermore, the wedge collar 31 remains rigidly attached with respect to the liner 34 and the pressure plate 21 since, as was mentioned before, the sum of the urging loads from the urging mechanism 25 and the strap plates 41 are set so as not to exceed the maximum frictional forces produced between the wedge collar 31, the liner 34 and the pressure plate 21. Thereby, the positions of the bolts 33 and their heads 33a do not move with respect to the pressure plate 21. In this situation, the fulcrum ring 24, prevented from moving in the outward axial direction by the restriction mechanism 40, does not move with respect to the pressure plate 21. Still, since the urging force of the strap plates 41 in turn works on the pressure plate 21 by way of the fulcrum ring 24 and the restriction mechanism 40, the pressure plate 21 is separated away from the flywheel 15. As a result, the pressure plate 21 separates from the facings 23, and the clutch engagement is released.

By setting the frictional forces which develop between the wedge collar 31 and the wedge 32 by way of the liner 34 larger than the frictional forces which occur between the wedge collar 31 and the pressure plate 21, consistent operation becomes assured. If the above size relations of the frictional forces were reversed, when the release operation occurred, the wedge collar 31 carried by the wedge 32 would then move with respect to the pressure plate 21.

Secondly, in the situation where an amount of wear W occurs due to use of the clutch.

Figure 6:
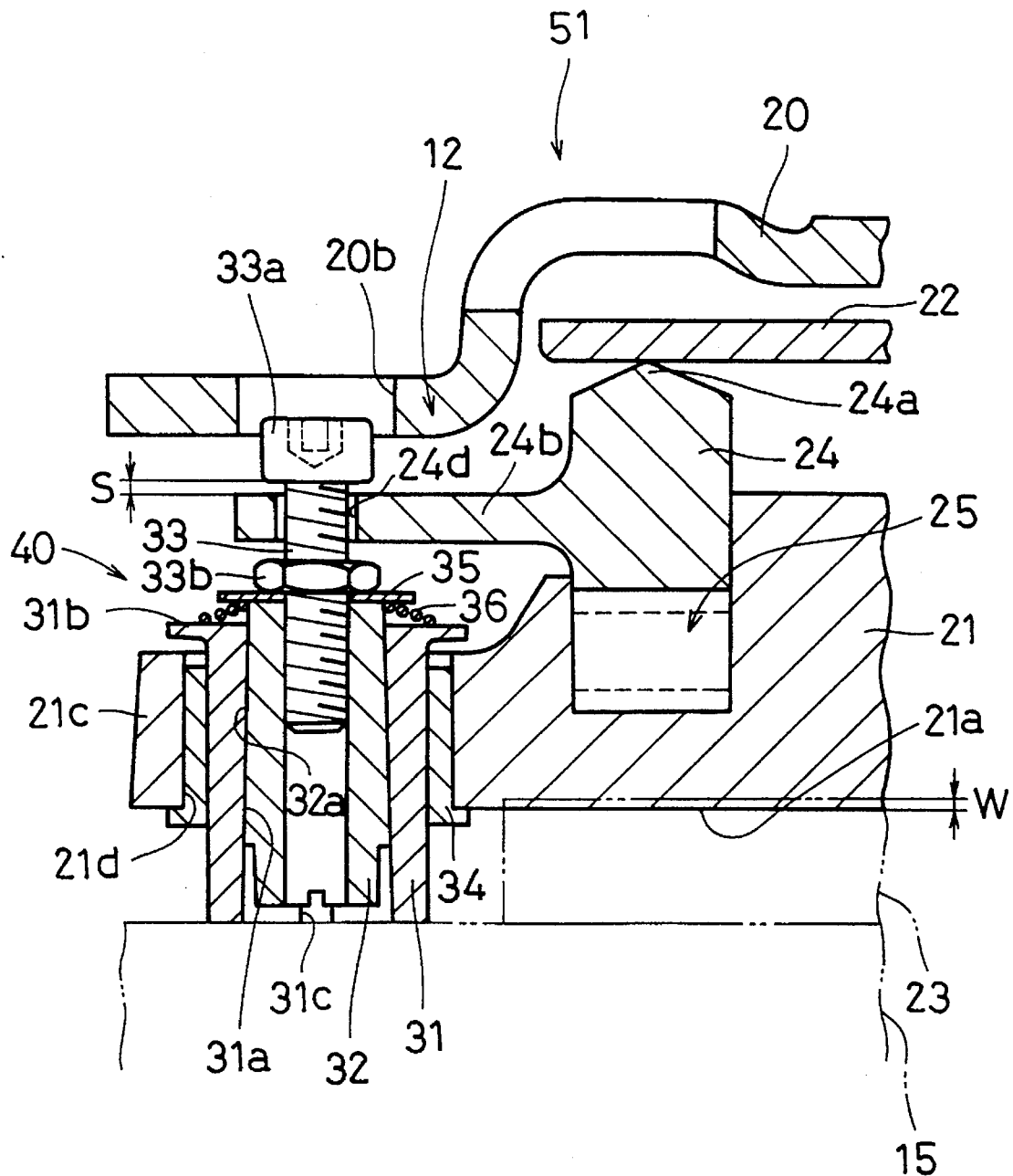
FIG. 6 is a fragmentary cross-section, similar to FIG. 2, showing clutch engagement where various parts are displaced with respect to the various position of parts in FIG. 2.

During engagement as is shown in FIG. 6, the fulcrum ring 24 and the pressure plate 21 move toward the flywheel 15 due to the pressing force from the diaphragm spring 22. The restriction mechanism 40 cannot move with respect to the flywheel 15 as one end of the wedge collar 31 engages the flywheel 15. That is when the facings 23 wear an amount W, the restriction mechanism 40 is pushed backward through the holes 21d of the pressure plate 21 a distance equivalent to the wear W. As a result, the space S equivalent to wear W develops between the flange 24b of the fulcrum ring 24 and the heads 33a of bolts 33.

Figure 7:
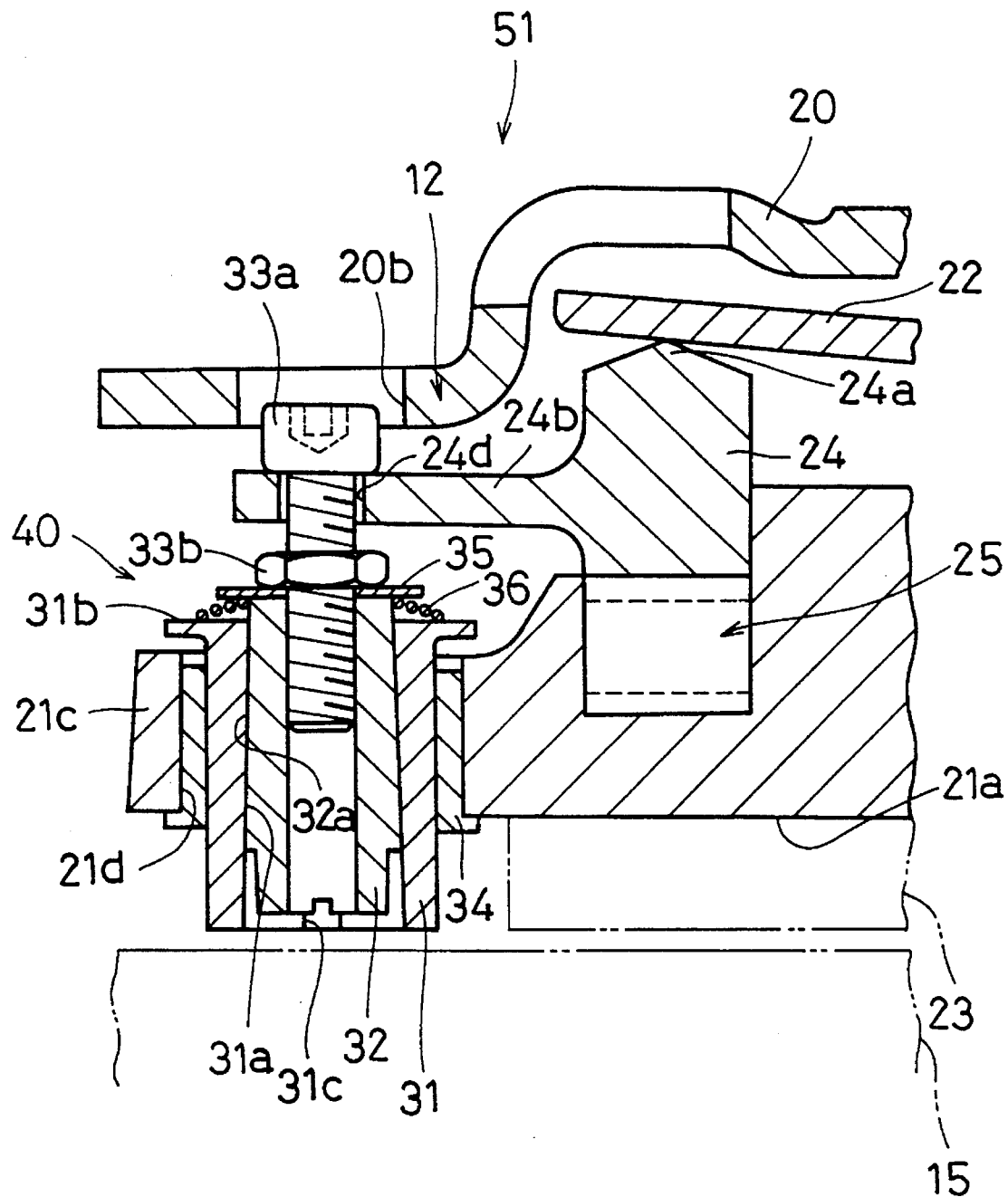
FIG. 7 is a fragmentary cross-section similar to FIGS. 2 and 6 showing further displacement of relatively moveable parts where the clutch has been released.

Next, when the release operation is carried out, the attitude of the diaphragm spring 22 becomes as shown in FIG. 7, and the fulcrum ring 24, the pressure plate 21 and the restriction mechanism 40 move as one toward the diaphragm spring 22. Still, since the pressing forces of the diaphragm spring 22 on the fulcrum ring 24 are removed during the release operation, the secondary taper block 27 raises the primary taper block 26 due to the outward forces of the compressed spring 29, and as a result the fulcrum ring 24 is moved in the outward axial direction. When the flange 24b contacts the heads 33a of bolts 33 the forces of the strap plates 41 and the urging mechanism 25 are then transferred to the restriction mechanism 40. Further movement of the restriction mechanism 40 within the holes 21d of the pressure plate 21 is completely restricted as discussed in the previous release operation. Accordingly, due to the large urging force of the diaphragm spring 22 upon the pressure plate 21, the restriction mechanism 40 is moved with respect to the pressure plate 21 during clutch engagement via the contact between one end of the wedge collar 31 and the flywheel 15. The height at which the bolt 33 holds the fulcrum ring 24 is thereby adjusted to make up for amount of wear on the facings 23. Conversely, movement of the restriction mechanism 40 with respect to the pressure plate 21 is completely restricted during clutch release. As a result, the fulcrum ring 24 moves extending outward a given distance toward the diaphragm spring equivalent to the amount of wear W on the facings 23, and is then stopped.

In subsequent engagement after the above operation is complete, the pressure plate 21 and the restriction mechanism 40 are again moved concurrently to the flywheel 15 due to the bias of the diaphragm spring 22. The axial height of the fulcrum ring 24, in its new set position against the head 33a of bolt 33, is situated to contact the diaphragm spring 22 at its initial height. In this way, the position at which the fulcrum ring 24 contacts the diaphragm spring 22 is fixedly maintained. That is, the biasing posture of the diaphragm spring 22 during engagement does not change, and the engagement load is maintained at the load originally set.

As a result, the following effects are accomplished.

(a) It is possible to make full use of the available friction pad, increasing the life span of the clutch.

(b) The efficiency of torque transmission during clutch use is preserved.

(c) The release characteristics of the release mechanism are unchanged, and the same consistent release load may constantly be applied.

Moreover, since the degree to which the fulcrum ring 24 protrudes is prevented by the restriction mechanism 40, the centrifugal force caused by the rotation of the engine does not cause the primary tapered block 26 to be pushed into the secondary tapered block 27, as was the problem in the description of the relative art. Instead centrifugal force urges the respective blocks into a fixed predetermined position. Rotation of the engine, therefore, does not adversely affect the clutch assembly 1, enabling precise extension of the fulcrum ring 24 a distance equivalent to the amount of wear on the facings and exact and consistent maintenance of the set engaging load.

Furthermore, as was explained above, even should the facings 23 wear, the position of the fulcrum ring 24 does not change with respect to the clutch cover 20.. That is, the posture of the strap plates 4 1 are kept fixed, and the urging forces of the strap plates 41 upon the fulcrum ring 24 are less likely to fluctuate.

In the conventional example the strap plates are connected to the pressure plate, the pressure plate moves toward the flywheel as the facings wear. Accordingly, the forces of the strap plates are made larger, further bringing about the following undesirable situation.

(a) The urging load on the pressure plate by the diaphragm spring is lessened;

(b) The increased forces on the urging mechanism require that the spring load of the urging member also be made larger. Such an increase of the spring load complicates assembly, and the slide force of the restriction mechanism is made excessively high.

The apparatus of the present invention overcomes the above stated problems, and decreases expense of the apparatus.

VARIATIONS (a) In the above embodiment, the strap plates are initially set flexed in the axial direction to impose an urging force on the fulcrum ring, however they may also be set in a relaxed position. In this situation, independent of whether or not the friction member is worn, the posture of the strap plates remains unchanged and no urging force is imposed.

(b) It is also possible to omit the liner. 34, disposing the wedge collar 31 within the hole 21*d* of the pressure plate 21 such that radial outer surface directly contacts the inside of the hole 21*d*. The radial outer surface 32*a* of the wedge 32 can the be treated with a solid lubricant whereby the frictional forces between the wedge collar 31 and the wedge 32 can be adjusted lower than the frictional forces between the wedge collar 3 1 and the pressure plate 21.

(c) The fixing portions 21*c* of the pressure plate 21 may be made separate elements each rigidly attached to the pressure plate 21 with, for example, a bolt.

In the clutch cover assembly of the present invention, since the strap plates are rigidly attached to the support member and the support member's position is unchanging in the axial direction, the posture of the strap plates is unchanged and fixedly preserved. Accordingly, fluctuation of the strap plate urging forces are suppressed.

Various details of the invention may be changed without departing from its spirit nor its scope. The foregoing description of the embodiments according to the present invention is provided for the purpose of illustration only, and not for limiting the invention as defined by the appended claims and their equivalents.

What is claimed:

1. A clutch cover assembly couplable to a flywheel, for engaging and disengaging a clutch disk to and from an input shaft of a transmission, comprising:

a dish shaped clutch cover fixed to a flywheel;

a disc shaped pressure plate disposed within said clutch cover, having a pressing surface contactable with one side of a clutch disk disposed between said pressure plate and said flywheel;

a support member disposed opposite the pressing surface of said pressure plate being non-rotatable with respect to said pressure plate and movable in an axial direction;

a pressing member urging said pressure plate toward said flywheel via said support member, said pressing member and said support member having a predetermined position relative each other initially;

a wear compensation device disposed between said pressure plate and said support member, restrictively supporting the support member at the predetermined position, and displacing the support member with respect to said pressure plate and thereby returning said support member to the predetermined position with respect to said pressing member after said support member and said pressure plate were displaced from the predetermined position due to wear on the clutch disk during clutch engagement; and strap plates elastically flexible in the axial direction, connecting said clutch cover and said support member to rotate together.

2. A clutch cover assembly according to claim 1, wherein said strap plates are initially biased to urge said support member in a direction away from said flywheel.

3. A clutch cover assembly according to claim 2, wherein said wear compensation device includes restriction means restrictively supporting the support member at the predetermined position with respect to the pressing member and an urging mechanism displacing the support member with respect to said pressure plate and thereby returning said support member to the predetermined position with respect to said pressing member after said support member and said pressure plate were displaced from the predetermined position due to wear on the clutch disks during clutch engagement.

4. A clutch cover assembly according to claim 3, wherein:

said pressure plate is formed with a plurality of axially extending holes; and said restriction means of said wear compensation device is made up of a plurality of restriction mechanisms frictionally held within said plurality of holes in said pressure plate, the first end of each of said restriction mechanisms contacting said flywheel during clutch engagement, and the second end holding said support member at the predetermined position with respect to said pressing member after release of said clutch engagement.

5. A clutch cover assembly according to claim 4, wherein the maximum frictional forces produced between said restriction mechanisms and said axial holes is smaller than the biasing forces of said pressing member on said support member and larger than the combined urging loads of said urging mechanism and said strap plates on said support member such that said restriction mechanisms only move during clutch engagement.

6. A clutch cover assembly according to claim 4, wherein:

said support member has a radially extending flanged portion formed with at least one hole; and said restriction mechanisms include at least one plug member shaped like a truncated cone and formed with a threaded bolt hole, at least one cylindrical member fashioned to be expandable in radial directions, having a tapered inner bore fashioned to complement the outer surface of said plug member when inserted inside, and having radially extending rim portion formed larger in diameter than the radius of the holes of said pressure plate; said cylindrical member having said plug member inserted therein being disposed in the holes of said pressure plate such that the radially largest end of said plug member faces said flywheel and such that said rim rests upon a side surface of the pressure plate opposite said pressing surface;

a threaded bolt threaded into said threaded bolt hole and extending through said hole in said extending flange portion of said support member restricting axial movement thereof 7. A clutch cover assembly according to claim 1, wherein:

said pressure plate has a annular groove formed in the circumferencial direction;

said support member is disposed in said annular groove; and said urging mechanism is accommodated deeper within said annular groove than said support member and includes, facing wedge members each having a main face extending in the circumferential direction, said faces of each member mutually touching each other, and an urging member urging one side of either of said wedge members in the opposite circumferential direction whereby one of said wedge members is movable in the axial direction.

8. A clutch cover assembly according to claim 7, wherein said wedge members are formed from a primary wedge disposed in said annular groove to be movable in the circumferential direction and having a primary slope, and a secondary wedge fixed to said support member and having a secondary slope sloping complementary to, facing, and contacting said primary slope.

9. A clutch cover assembly according to claim 7, wherein said urging member is a coil spring.

* * * * *